(12) United States Patent
Spears et al.

(10) Patent No.: US 6,852,401 B2
(45) Date of Patent: Feb. 8, 2005

(54) COMPOSITE FLYWHEEL RIM WITH CO-MINGLED FIBER LAYERS AND METHODS FOR MANUFACTURING SAME

(75) Inventors: Ward R. Spears, Essex, MA (US); Cynthia L. Shirey, Nashua, NH (US)

(73) Assignee: Beacon Power Corporation, Wilmington, MA (US)

( * ) Notice: Subject to any disclaimer, the term of this patent is extended or adjusted under 35 U.S.C. 154(b) by 0 days.

(21) Appl. No.: 09/952,151

(22) Filed: Sep. 13, 2001

(65) Prior Publication Data

US 2003/0049429 A1 Mar. 13, 2003

(51) Int. Cl.[7] .......................... B32B 15/14; F15H 55/17
(52) U.S. Cl. .................... 428/293.1; 74/572; 242/437.3
(58) Field of Search ........................ 242/437.3; 74/572; 428/293.1

(56) References Cited

U.S. PATENT DOCUMENTS

| | | | |
|---|---|---|---|
| 3,602,067 A | 8/1971 | Wetherbee, Jr. ............. | 74/572 |
| 4,020,714 A | 5/1977 | Rabenhorst .................. | 74/572 |
| 4,023,437 A | 5/1977 | Rabenhorst .................. | 74/572 |
| 4,080,845 A | 3/1978 | Hatch .......................... | 74/572 |
| 4,187,738 A | 2/1980 | Knight, Jr. et al. ........... | 74/572 |
| 4,207,778 A * | 6/1980 | Hatch .......................... | 74/572 |
| 4,285,251 A * | 8/1981 | Swartout ...................... | 74/572 |
| 4,370,899 A | 2/1983 | Swartout ...................... | 74/572 |
| 5,000,807 A | 3/1991 | Stuart .......................... | 156/166 |
| 5,122,417 A | 6/1992 | Murakami et al. ........... | 428/371 |
| 5,182,839 A | 2/1993 | Stuart .......................... | 28/283 |
| 5,241,731 A | 9/1993 | Stuart .......................... | 28/282 |
| 5,285,699 A | 2/1994 | Walls et al. .................. | 74/572 |
| 5,580,627 A | 12/1996 | Goodwin et al. ........... | 428/36.3 |
| 5,695,584 A | 12/1997 | Gregoire ..................... | 156/169 |
| 5,811,900 A | 9/1998 | Serdar, Jr. et al. ............ | 310/74 |
| 5,912,519 A | 6/1999 | Horner et al. ................ | 310/74 |
| 6,138,527 A | 10/2000 | Bitterly et al. ............... | 74/572 |
| 6,150,742 A | 11/2000 | Horner et al. ................ | 310/74 |
| 6,247,382 B1 | 6/2001 | Umeki et al. ................ | 74/572 |
| 6,299,718 B1 | 10/2001 | Kimura et al. .............. | 156/173 |
| 2002/0056782 A1 * | 5/2002 | Gabrys ...................... | 242/437.3 |
| 2002/0083791 A1 * | 7/2002 | Detore et al. ................ | 74/572 |
| 2003/0049429 A1 * | 3/2003 | Spears et al. ............. | 428/293.1 |
| 2003/0049430 A1 * | 3/2003 | Spears ..................... | 428/293.1 |
| 2003/0061898 A1 * | 4/2003 | Brackett et al. ............. | 74/572 |

FOREIGN PATENT DOCUMENTS

| | | | | |
|---|---|---|---|---|
| EP | 1 077 335 A1 | 8/2001 | ......... | F16F/15/305 |
| JP | 2000-55134 | 2/2000 | ......... | F16F/15/305 |
| WO | WO 02/01311 A1 | 1/2002 | ........... | G05G/3/00 |
| WO | WO 03/026882 A1 * | 4/2003 | | |

* cited by examiner

Primary Examiner—Rena Dye
Assistant Examiner—J. M. Gray
(74) Attorney, Agent, or Firm—Edwards & Angell, LLP; David G. Conlin; Richard J. Roos

(57) ABSTRACT

A composite-based rim and methods for manufacturing such a rim are provided. The rim includes multiple fiber-based, co-mingled layers, wherein the strength and/or stiffness of the layers increases from the innermost layer of the rim to the outermost layer of the rim, but where the radial stress and strain generated in the rim decreases from the innermost layer to the outermost layer. Incorporation of this rim into a high stress and strain usage environment, such as a flywheel system, allows the rim to be spun at high speeds in order to generate high levels of kinetic energy while beneficially managing the amount of strain and radial stresses generated within the rim, and, in turn, minimizing or at least controlling the formation and propagation of cracks within the rim.

12 Claims, 2 Drawing Sheets

COMPOSITE FLYWHEEL RIM WITH CO-MINGLED FIBER LAYERS AND METHODS FOR MANUFACTURING SAME

FIELD OF THE INVENTION

The present invention relates generally to composite-based rims, and methods for their manufacture. More particularly, the present invention relates to composite-based rims that are ideally suited for incorporation into flywheel systems because the rims are comprised of a plurality of co-mingled fiber layers, the compositions of which differ from layer to layer, and because the compositions of the layers are selected such that life limiting rim conditions, such as radial stresses and strains directed against the rims, that are encountered during operation of the flywheel systems are able to be controlled more effectively as compared to conventional composite-based rims.

BACKGROUND OF THE INVENTION

Flywheel systems have been known in the art for a number of years, and have proven to be extremely useful in industrial settings (as, for example, uninterruptible power supplies) due to their excellent ability to generate, store and recover kinetic energy. A typical flywheel includes a flywheel, a shaft to which the flywheel is secured, as well as one or more bearing assemblies that rotatably support the shaft. A flywheel system also includes a protective outer rim, which is supported by a hub that serves to connect the rim to the shaft.

In operation, a high-powered, high-strength motor drives the shaft, which itself drives a rotor at a high velocity. This causes the rim of the flywheel system to rotate/spin rapidly, which, in turn, creates a significant amount of kinetic energy in accordance with the following equation:

$$\text{Energy} = \tfrac{1}{2} * (\text{rim density}) * (\text{rim volume}) * (\text{rotor radius of gyration})^2 * (\text{rotational speed of rim})^2$$

Since the advent of flywheels, those in this art have constantly aimed to design a flywheel system that is able to generate as much kinetic energy as possible according to this equation without compromising the safe operation of the flywheel system. To that end, several years ago, designers began to experiment with switching from metal-based to composite-based rims.

Metal-based rims had proven problematic in use because their somewhat low yield strength limited their ability to generate rotational speed and, therefore, the ability of the flywheel system to generate significant amounts of kinetic energy. And although metal-based rims had proven highly failure resistant, when they did fail, they tended to break into three large, heavy pieces, which were jettisoned from the flywheel system, thus presenting a danger to surrounding persons and property alike.

Composite-based rims are not only lighter than metal-based rims, but can have comparable or even higher strengths and stiffnesses, thus allowing them to achieve much higher rotational speeds and, therefore, to apparently provide most, if not all of the benefits of metal-based rims, without the aforementioned risks/drawbacks.

Not surprisingly, within just a few years of their discovery, composite based rims had become the standard in the flywheel system industry.

More recently, however, it has become evident that composite-based rims also encounter problems in use, chief among which is their susceptibility to failure due to radial stresses and strains that arise during operation of a flywheel system.

As noted above, flywheel systems that incorporate composite-based rims are primarily advantageous as compared to metal-based rims because their lower weight allows them to be able to rotate more rapidly than metal-based rims and, in turn, to generate more energy for storage than would be generated by an otherwise identically dimensioned metal-based rim. But as the speed of rotation of any flywheel system rim (whether metal- or composite-based) increases, so too does the undesirable strain, and hoop/radial stresses placed against it according to the equations:

$$\text{Hoop Stress} = (\text{rim density}) * (\text{rim radius})^2 * (\text{rim rotational speed})^2 = (\text{strain}) * (\text{modulus})$$
$$\text{Radial Stress} \sim (\text{rim density}) * (\text{rim Thickness})^2 * (\text{rim rotational speed})^2$$

Thus, for example, according to the second equation, a first rotating rim that is twice as thick as a second rotating rim will accumulate approximately four times more radial stresses than the second rotating rim. This marked increase in the generation of stresses and strains in a composite-based rim, which has a relatively low radial strength as compared to its hoop strength.

Realizing this, but not wanting to sacrifice the benefit(s) of increased rim rotational speed (and, thus, increased kinetic energy), some suggested reducing the overall thickness of composite-based rims, while increasing the rims' overall length.

The likely rationale for doing so was the fact that the square of the rim thickness is proportional to the amount of strain and radial stress encountered in the rim, such that a decreased rim thickness should offset enough of the increase in rotational speed of the rim to keep the amount of strain and radial stress encountered in the rim within a manageable range. The reason that the length of the rim (which, when factored into the rim volume, is proportional to the amount of kinetic energy produced by the rim) was increased was to compensate for the reduction in energy that would be caused by reducing the rim's cross sectional area, the square of which is also directly proportional to the amount of kinetic energy generated by the rim.

Unfortunately, flywheel systems that incorporated rims with both reduced thickness and increased lengths proved to be unduly expensive not only to produce but also to implement and operate in usage environments, and, therefore, quickly grew out of favor in the art.

Therefore, a need remains for a composite-based rim for use in flywheel systems, wherein the design of the rim positively influences the ability of the rim to generate energy without negatively influencing, due to the generation of unmanageable radial stresses and strains, the rim's longevity and the safe operation of a flywheel system within which the rim is incorporated.

SUMMARY OF THE INVENTION

The present invention meets this, and other needs by providing composite-based flywheel system rims comprised of a plurality of co-mingled fiber layers, as well as methods for manufacturing such rims. Although the composite-based rim of the present invention is primarily described as being applicable to flywheel-based evacuated energy storage systems, it may be used in other environments in which stresses and strains are encountered, and are sought to be manageably controlled.

In an exemplary aspect of the present invention, a composite-based rim is comprised of a plurality of tailored, co-mingled fiber-based layers. The rim should include at least two fiber layers, and may include a plurality of layers up to, or even greater than ten. In an exemplary aspect of the present invention, the rim includes four layers.

Each layer is preferably comprised of a different combination of fiber(s) than the other layer(s) such that the rim exhibits increased strength and/or stiffness in each of its successive layers from its innermost layer to its outermost layer.

The rim layers include "low" strength/stiffness fibers and/or "high" strength/stiffness fibers, wherein the volume percentage of "low" strength and/or stiffness fiber(s) contained in each layer successively decreases or remains constant from the innermost rim layer to the outermost rim layer, while the volume percentage of "high" strength and/or stiffness fiber(s) contained in each layer successively increases or remains constant from the innermost layer to the outermost layer.

In a preferred aspect of the present invention, the rim includes four layers wherein the volume percentage of "low" strength and/or stiffness fiber(s) decreases from the first layer of the rim, to the second layer, to the third layer, to the fourth layer, while the volume percentage of "high" strength and/or stiffness fiber(s) increases from the first layer, to the second layer, to the third layer, to the fourth layer.

The specific compositions of the layers of the rim not only are selected to tailor the strengths and stiffnesses of the rim, but also to create a smooth gradient of radial stress and strain from layer to layer.

By varying the composition of the layers, not only are the strength and stiffnesses of those layers varied, so too are their densities and moduli, both of which affect the generation of radial stress an strain on the rim, which, in turn, affect the formation of undesirable cracks within the rim.

And by smoothly varying the stiffnesses and densities of the layers, the composite-based rim become, in effect, a radial succession of thin rings spinning together, with the inner rings desirably loading the outer rings in slight radial compression. Conventional composite-based rims do not have compositions that allow them to achieve this type of smooth radial stress and strain gradient, and thus are less resistant to crack formation, and less effective to guard against rim failure than composite-based rims of the present invention.

Moreover, even in the unlikely event that a crack does form in a rim of the present invention, the crack will likely form in the innermost layer of the rim, and will be inhibited from propagating into and through the other three layers of the rim. And even if the crack does manage to propagate, that will cause a flywheel system upset/imbalance condition, which will be sensed and acted upon before the crack has time to propagate through all of the layers of the rim.

Therefore, the composition of a rim of the present invention represents an ideal design philosophy that not only deters crack formation in the rim by controlling the radial stresses encountered within the rim to manageable levels, but, by virtue of the tailored compositions of the layers, causes cracks (if any are formed at all) to be initially formed in the first layer, and severely inhibits the ability of such cracks to propagate into the second, third, and especially fourth layer of the rim. This, in turn, allows a flywheel system that incorporates a composite-based rim in accordance with the present invention to be confidently operated at high speeds without fear of adverse effects (i.e., rim failure/burst), thus allowing for the flywheel system to beneficially generate a comparatively large amount of kinetic energy.

The present invention also includes a method for manufacturing a composite-based rim, preferably via a filament winding technique. In accordance with an exemplary aspect of this method, fiber tows are stored within, and dispensed from one or more racks/holders within a device (e.g., a creel) and are layered atop each other in predetermined co-mingled tow arrangements in order to preliminarily form each of the fiber layers of the rim.

This preliminarily formed layer is directed through one or more physical adjustment devices (e.g., one ore more rollers and/or one or more combs) and then into a resin treatment area of the apparatus where a spinning drum is continuously being impregnated with wet resin being held within a holding area (e.g., a resin bath). As the layer advances through the resin treatment area, the resin-coated drum spins in the direction of advancement of the layer, thus causing the bottom-facing side of the fiber layer to be coated (by the drum) with wet resin mixture.

The wet layer is then directed through one or more additional physical adjustment devices (e.g., one or more rollers and/or one or more combs) to produce a uniform, wet layer of fiber material or predetermined bandwidth. Thereafter, the layer is fed through a guiding device (e.g., an eyelet) and caused to be wound onto a shape-instilling shell to form one of the layers of the multiple-layer rim of the flywheel system. Once all the desired layers of the rim have been wound onto the shell, the shell is cured, thus causing the resin on each layer to dry.

Other aspects and embodiments of the present invention are discussed in detail below.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views, and wherein.

DETAILED DESCRIPTION OF THE INVENTION

Figure 1:
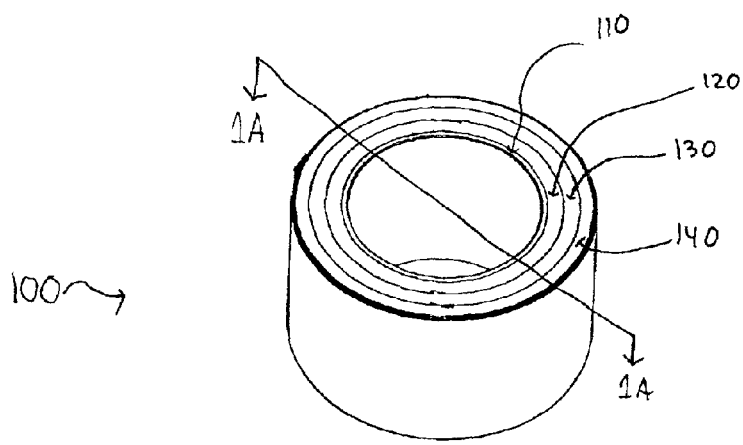
FIG. 1 is a schematic view of a composite-based rim in accordance with the present invention.
Figure 1A:
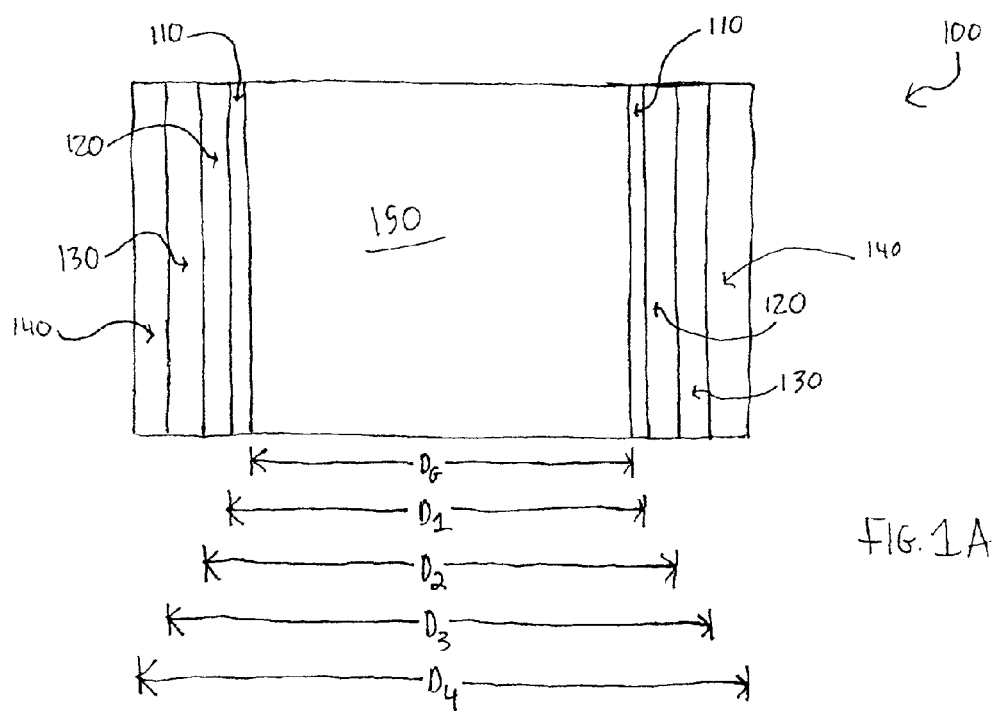
FIG. 1A is a cross sectional view of the rim of FIG. 1 along the line A—A.

FIGS. 1 and 1A depict an exemplary composite-based rim 100 in accordance with the present invention. Incorporation of this rim 100 into a high stress and strain usage environment, such as a flywheel system, allows the flywheel system to be spun at high speeds in order to generate high levels of kinetic energy while managing the amounts/levels of strain and radial stresses generated within the rim, and, in turn, minimizing or at least reliably controlling the formation and propagation of cracks within the rim.

The rim 100 is comprised of a plurality of tailored, co-mingled fiber-based layers, each of which is spun or wound atop another layer via techniques such as the exemplary filament winding technique described below and depicted in FIG. 2. The rim 100 should include at least two fiber layers, and may include a plurality of layers up to, or even greater than ten. Each layer is preferably comprised of a different combination of fiber(s) than the other layer(s) such that the rim exhibits increased strength and/or stiffness in each of its successive layers from its innermost layer to its outermost layer. Also, each successive layer of the rim from its innermost layer to its outermost layer has a lower density.

The exemplary rim 100 of FIGS. 1 and 1A is comprised of four layers—a first, innermost layer 110, a second layer 120, a third layer 130, and a fourth, outermost layer 140. A gap 150 is defined within the inner layer 110 of the rim 100, and will ultimately house, for example, the shaft (not shown) and hub (not shown) of a flywheel system.

Because the rim 100 exhibits increased strength and/or stiffness in each of its successive layers, the fourth, outermost layer 140 of the rim 100 is stronger and/or stiffer than the rim's third layer 130, which is stronger and/or stiffer than the second layer 120 of the rim, which is stronger and/or stiffer than the rim's first, innermost layer 110.

To that end, and in accordance with an exemplary embodiment of the present invention, the first, innermost layer 110 of the rim 100 is comprised entirely of a comparatively "low" strength and/or stiffness fiber, while the fourth, outermost layer 140 of the rim is comprised entirely of a fiber with comparatively "high" strength and stiffness characteristics.

The volume percentage of "low" strength and/or stiffness fiber(s) contained in each layer 110, 120, 130, 140 of the rim 100 successively decreases or remains constant from the rim's first layer 110 to its fourth layer 140, while the volume percentage of "high" strength and/or stiffness fiber(s) contained in each layer successively increases from the first layer to the fourth layer.

More specifically, each of the second and third layers 120, 130 preferably contains at least 20% by volume of both "low" and "high" strength and/or stiffness fiber materials, wherein the second layer 120 includes a greater volume percentage of "low" strength and/or stiffness fiber(s) than "high" strength and/or stiffness fiber(s), and wherein the third layer includes a greater volume percentage of "high" strength and/or stiffness fiber(s) than "low" strength and/or stiffness fiber(s).

In a currently preferred embodiment of the present invention, the composition of a composite-based rim 100 is as shown below in Table I.

TABLE I

| Layer of rim | Volume percentage of "low" strength and/or stiffness fibers | Volume percentage of "high" strength and/or stiffness fibers |
| --- | --- | --- |
| First, innermost layer | about 100% | about 0% |
| Second layer | about 80% | about 20% |
| Third layer | about 40% | about 60% |
| Fourth, outermost layer | about 0% | about 100% |

The "low" strength and/or stiffness fibers that partially comprise the first, second and third layers 110, 120, 130 of the rim 100 generally have a stiffness (i.e., modulus) in the range of about 8 Msi to 12 Msi, preferably about 10 Msi to 11 Msi, and most preferably about 10.5 Msi. These "low" strength and/or stiffness fibers also generally have a strength in the range of about 300 Ksi to 500 Ksi, preferably about 350 Ksi to 400 Ksi, and most preferably about 375 Ksi.

One, some or all of the layers 110, 120, 130 that include "low" strength and/or stiffness fibers may include solely one specific type of "low" strength and/or stiffness fiber, or may include a plurality of different types of such fibers, but each "low" strength and/or stiffness fiber included within each of these layers preferably has strength and/or stiffness characteristics that fall within the above ranges.

Numerous suitable "low" strength and/or stiffness fibers are known; however, current exemplary "low" strength and/or stiffness fibers include, but are not limited to, E-glass fiber, which is commercially available from numerous commercial suppliers (e.g., Owens Corning of Toledo, Ohio, USA), as well as steel wire, which is also commercially available from numerous suppliers (e.g., Baekaert Corporation of Marietta, Ga., USA).

The "high" strength and/or stiffness fibers that partially comprise the second and third layers 120, 130 of the rim 100, and that entirely comprise the rim's fourth layer 140 generally have a stiffness in the range of about 28 Msi to 50 Msi, preferably about 28 Msi to 37 Msi, still more preferably in the range of about 32 Msi to 35 Msi, and most preferably in the range of about 33 Msi to 34 Msi, and a strength generally in the range of about 400 Ksi to 800 Ksi, preferably about 500 Ksi to 800 Ksi, and most preferably about 600 Ksi to 700 Ksi.

One, some or all of the layers 110, 120, 130, 140 of the rim 100 may include solely one specific type of "high" strength and/or stiffness fiber, or may include a plurality of different types of such fibers, but each "high" strength and/or stiffness fiber included within each of these layers preferably has strength and/or stiffness characteristics that fall within the above ranges.

Numerous suitable "high" strength and/or stiffness fibers are known. Generally, the "high" strength and/or stiffness fibers are carbon-based fibers, with currently exemplary "high" strength and/or stiffness carbon fibers including, but not being limited to, T-700 carbon fiber, which is commercially available from numerous commercial suppliers, such as Toray Composites, Inc. of Tacoma, Wash., USA.

The compositions of the layers 110, 120, 130, 140 of the rim 100 not only are selected to tailor the strengths and stiffnesses of the rim, but also to create a smooth gradient of radial stress and strain from layer to layer.

Specifically, by varying the composition (i.e., the volume percentages of "low" and "high" strength and/or stiffness fibers) of the layers 110, 120, 130, 140, not only are the strength and stiffnesses of those layers varied, so too are their densities and moduli. The density and modulus of each layer of the rim 100 are important factors in the equations (see below) that govern flywheel system operation and, more particularly, that directly influence generation of radial stress and strain in the rim.

$$\text{Energy} = \frac{1}{2} * (\text{rim density}) * (\text{rim volume}) * (\text{rotor radius of gyration})^2 * (\text{rotational speed of rim})^2$$

$$\text{Hoop Stress} = (\text{rim density}) * (\text{rim radius})^2 * (\text{rim rotational speed})^2 = (\text{strain}) * (\text{modulus}) \quad \text{Radial Stress} \sim (\text{rim density}) * (\text{rim thickness})^2 * (\text{rotational speed of rim})^2$$

By having a rim 100 comprised of four layers 110, 120, 130, 140 with compositions as set forth above, the rim (during operation) is able to produce a desirably smooth gradient of radial stresses and strains from the inner layer of the rim to the outer layer of the rim.

This "smooth" gradient is caused by the variation in composition from layer to layer of the rim 100, plus the fact that the density of the "low" strength/stiffness fibers is greater than the density of the "high" and higher" strength/stiffness fibers, while the hoop modulus of the "low" strength/stiffness fibers is less than the hoop modulus of the "high" and "higher" strength/stiffness fibers. Therefore, wherein the amount of "low" strength and/or stiffness fibers decreases from the first, innermost layer 110 to the fourth, outermost layer 140 of the rim, and the amount of "high" strength and/or stiffness fibers increases from the first layer to the fourth layer, the modulus of each layer also increases from the innermost layer to the outermost layer. In addition, the density of each layer may be reduced from the innermost layer 110 to the outermost layer 140. This allows the inner layers of the rim to radially load the rim's outer layers, thus reducing the radial stress and strain in all of the rim layers.

But because the composition of each layer does not radically change from layer to layer, the density and modulus of each layer also do not radically change from one layer to the next. This, in turn, creates a "smooth" hoop stress and strain gradient, where the increase from one rim layer to the next is not a sharp increase, but rather a comparatively small, incremental increase. At the same time, the radial stress and strain of each layer remains bounded from the inner layer 110 to the outer layer 140.

According to the above equations, further control over the radial stress and strain gradient in the rim can be achieved by modifying the radius of one or more of the layers 110, 120, 130, 140 of the rim 100.

Each layer 110, 120, 130, 140 of the rim 100, however, has a predetermined, non-modified diameter/radius, as shown in FIG. 1A. Preferably, the gap 150 has a diameter, $D_G$, of about 13.25 inches, and, thus, a radius of about 6.625 inches. The diameter, $D_1$, of the rim 100 at its first layer 110 is about 14.15 inches; the diameter, $D_2$, of the rim at its second layer 120 is about 16.4 inches; the diameter, $D_3$, of the rim at its third layer 130 is about 18.7 inches, and the diameter, $D_4$, of the rim at its fourth layer 140 is about 21.1 inches. Therefore, the preferred, non-modified radii of the rim 100 at its first, second, third, and fourth layers 110, 120, 130, 140 are, respectively, about 7.075 inches, 8.2 inches, 9.35 inches, and 10.55 inches.

These radii are preferred based on the composition of the layers 110, 120, 130, 140 of the rim 100. It should be understood, however, that one, some or all of the layers 110, 120, 130, 140 of the rim 100 may have radii/diameters that are greater or less than these preferred diameters/radii for various reasons (e.g., in order to allow/facilitate modification or variation of the radial stress and strain gradients of the rim from layer to layer) without departing from the scope of this invention.

Conventional composite-based rims do not achieve this type of smooth gradient due to having thicker layers of fibers, wherein the fibers composition is uniform from layer to layer.

If, for example, a conventional rim is comprised of separate layers that are each made of the same material, no change in radial stress or strain (i.e., no gradient) will occur from layer to layer. If, instead, a conventional flywheel system rim is comprised of separate layers of different material, each of which comprises 100% of a particular material, then the difference in radial stress and strain from layer to layer will be highly pronounced, thus resulting in a sharp radial stress and strain gradient.

Therefore, in contrast to conventional composite-based rims, a rim 100 in accordance with the present invention exhibits a gradual increase in strength and stiffness from its first layer 110 to its fourth layer 140, and bounds the radial stress and strain from its first to fourth layers. This results in a rim 100 that is much more failure resistant than conventional composite-based rims, as shown in the following comparative examples.

Comparative Examples

Two four layer composite-based rims of the present invention were tested for comparison purposes against three conventional two-layer rims, wherein each layer of the conventional rims was entirely comprised of T-700 carbon-fibers, and wherein the two layers of the conventional rims were not co-mingled. All five of the rims tested had identical overall dimensions (thus indicating that the radial thickness of each layer of the two-layer rim was 2.5 times greater than the radial thickness of the five-layer rim of the present invention), and were incorporated into otherwise identical flywheel systems for testing purposes.

One or more cracks were observed to have formed in each of the three conventional two-layer rims that were tested. Specifically, crack formation was observed in the first conventional two-layer rim tested after 14.17 hours of flywheel system operation at 20.3 KPM, in the second conventional two-layer rim tested after 5 hours of flywheel system operation at 15 KPM, and in the third conventional two-layer rim tested after 3.23 hours of flywheel system operation at 18.4 KPM. Thus, on average, crack formation was observed in these conventional two-layer rims after only 7.47 hours of flywheel system operation at 17.9 KPM.

Two four-layer rims 100 having characteristics in accordance with the present invention, and having overall dimensions identical to the three conventional two-layer rims tested were incorporated into otherwise identical flywheel systems to the flywheel systems into which the conventional three two-layer rims were incorporated for testing. Crack formation was not observed in either the first four-layer rim after 24 hours of flywheel system operation at 23.5 KPM, or the second four-layer rim after 500 hours of flywheel system operation at 22.5 KPM.

According to these results, four-layer rims 100 in accordance with the present invention are safer than otherwise identically dimensioned conventional composite-based rims, even if incorporated into otherwise identical flywheel systems that were operated at much higher rotational speeds for much longer durations as compared to the flywheel systems into which the conventional two-layer rims were incorporated. Moreover, this added rotational speed and duration of operation of a flywheel system that incorporates a four-layer rim 100 of the present invention will translate into the generation of much higher amounts of kinetic energy as compared to a flywheel system that incorporates one of the conventional two-layer rims that was tested.

Additionally, even though these tests indicate that four-layer rims allow for safe operation of a flywheel system without the formation of cracks in the rim, the design of a rim in accordance with the present invention is such that even if a crack was to form in the rim, the crack would most likely form in a predetermined layer of the rim, and would not propagate enough to cause failure of the rim prior to the crack being detected by safety equipment/monitors.

As noted above, the strength and stiffness of each layer of the rim increases from the first layer 110 of the rim 100 to the fourth layer 140 of the rim, while the radial stress and strain decreases from the first layer to the fourth layer. Thus, in the unlikely event that a crack does form in a four-layer rim of the present invention, it will most likely form in the rim's first, innermost layer, which is the comparatively weakest layer of the rim and the layer that encounters the highest radial stresses and strains.

And if/when a crack does form in the first layer, the crack will be inhibited from propagating into the second layer because each layer has co-mingled fibers, and because the second layer is stronger than the first layer and, thus, is more resistant to crack formation/propagation. And if a crack does happen to propagate into the second layer of the rim, it will be inhibited from propagating into the stronger third layer, and so on. The fourth layer of the rim is especially highly resistant to crack formation/propagation because it is comprised entirely of one or more "high" strength and/or stiffness fibers.

Therefore, there will be a significant delay between the onset of a crack in the first, innermost layer of the rim and the propagation of that crack through the entire radius of the rim. This delay will be more than long enough to allow flywheel system safety equipment/monitors to detect that a crack has formed, to trigger a cessation of power to the flywheel system, and for the flywheel system to safely decelerate and spin to a halt prior to rim failure/burst.

The flywheel system is able to detect the onset of a crack because such an event will cause an upset and/or imbalance condition in the spinning flywheel system, wherein such a condition will be sensed by level controls (not shown) or other equipment incorporated into the flywheel system. Upon sensing this condition, the level controls would immediately cause discontinuation of the supply of power to the flywheel, thus causing the flywheel to gradually decelerate to a stop.

Therefore, the four-layer rim compositions of the present invention represent an ideal design philosophy that not only deters crack formation in the rim by controlling the radial stresses encountered within the rim to manageable levels, but, by virtue of the tailored compositions of the layers, causes cracks (if any are formed at all) to be initially formed in the first layer, and severely inhibits the ability of such cracks to propagate into the second, third, and especially fourth layer of the rim. This, in turn, allows the flywheel system to be confidently operated at high speeds up to and above 22.5 KPM without fear of adverse effects (i.e., rim failure/burst), thus allowing for the flywheel system to beneficially generate a large amount of kinetic energy.

Figure 2:
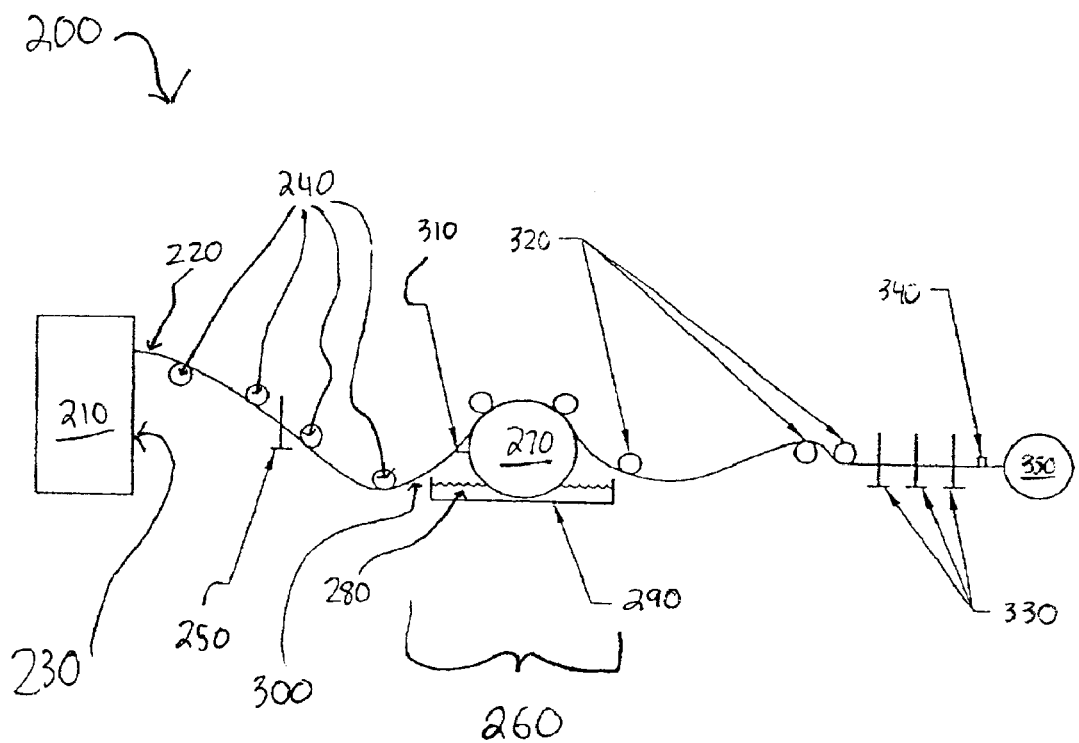
FIG. 2 is a schematic view of an apparatus for manufacturing the rim of FIG. 1.

Referring now to FIG. 2, an apparatus 200 is shown for manufacturing a composite rim via a filament winding technique in accordance with the present invention. The apparatus 200 includes a combined fiber storage/dispensing device 210 (e.g., a creel), which is equipped with at least one holder/rack (not shown), for holding a unit (e.g., a spool) of fiber material, and for dispensing tows of fiber from one or more of the spools as is generally known in the art.

Preferably, the number of racks/holders present in the device is greater than or, preferably, equal to the number of tows that will be combined by the apparatus to form each separate layer of the rim. Ten racks are preferable for practicing the present invention, in which each layer of the rim 100 (whether the layer is comprised of solely one type of fiber, or of a combination of more than one fiber) generally includes ten tows, each of which can be supplied from one of the holders. It is understood, however, that the number of holders is not crucial, however, as the process can be carried out by one of ordinary skill in the art without undue experimentation with greater than or fewer than ten holders.

Fiber material is fed from each rack/holder and layered atop each other in predetermined tow arrangements in order to co-mingle the tows in each of the layers of the rim. This preliminarily formed layer 220 emerges from an output end 230 of the device 210 and is directed through one or more alignment/tensioning devices (e.g., one ore more rollers 240 and/or one or more combs 250) that is/are effective to align the fibers within the preliminarily formed layer, to control the tension of the layer, and/or to provide the layer with a predetermined bandwidth (i.e., thickness). The layer 220 then enters a resin treatment area 260 of the apparatus 200 where a spinning drum 270 is continuously being impregnated with wet resin 280 from a holding area 290 (e.g., a resin bath). The wet resin 280 can be any epoxy suitable for filament winding, or any suitable thermoset or thermoplastic resin system. Preferably, the resin is selected such that when it cures it has a minimum tensile strength of about 4 Ksi.

As the layer 220 advances through the resin treatment area 260, the resin-coated drum 270 spins in the direction of advancement of the layer, thus causing the bottom-facing side 300 of the fiber layer to be coated with wet resin 280. Optionally, the resin treatment area 260 may also include an implement (e.g., a knife 310) to control the thickness of the resin mixture 280 being coated upon the layer 220.

It should be understood that the resin 280 can be introduced to the layer 220 via different techniques than that which is described above and depicted in FIG. 2. By way of non-limiting example, the layer 220 can be directed into the resin holding area 290, thus causing it to be coated with resin. Other alternative techniques are generally known in the art.

The wet layer 220 is then directed through one or more additional alignment/tensioning devices (e.g., one or more rollers 320 and/or one or more combs 330) to produce a uniform, wet layer of fiber material or predetermined bandwidth. Generally, the bandwidth is of each layer is in the range of about 1.0 inch to 1.3 inch, preferably in the range of about 1.05 inch to about 1.15 inch.

The layer 220 is fed through a guiding device 340 (e.g., an eyelet) and onto a shape-instilling shell 350 (e.g., a metal-based mandrel), which is rotating in the direction of advancement of the layer. The layer 220 is caused to be wound onto the rim shell/base 350 to form one of the layers of the multiple-layer rim 100 of the flywheel system.

Once all the layers of the rim 100 are in place, the shell 350 is cured (e.g., via an oven), thus causing the resin 280 on each layer to dry, and causing the mandrel 350 to outwardly expand. Thereafter, the mandrel 350 is removed from the oven and allowed to cool. During cooling, the mandrel 350 shrinks to its original dimensions, thus facilitating removal of the rim 100 therefrom. Optionally, objects known in the art (e.g., peel plies and/or bleeder cloths) may be utilized to facilitate/expedite the removal of the rim 100 from the shell 350 following curing.

In an exemplary embodiment of the present invention, ten tows of fiber comprise each layer of the rim 100, wherein the selection of the specific tows for inclusion in each layer is made based on the desired volume percentage composition of that particular layer. Because the fourth layer 140 of the rim 100 is comprised of 100% "high" strength and stiffness fibers, that layer is generally formed of ten co-mingled tows of "high" strength and/or stiffness fibers, while because the first layer 110 of the rim is comprised of 100% "low" strength and/or stiffness fibers, that layer is generally formed of ten co-mingled tows of "low" strength and/or stiffness fibers.

The remaining layers 110, 120 of the rim 100 are comprised of "low" strength and/or stiffness and "high" strength and/or stiffness fibers, and are formed, pro rata, from co-mingled tows of those types of fibers. For example, the second layer 120 of the rim 100 is comprised of about 80% "low" strength and/or stiffness fibers and about 20% "high" strength and/or stiffness fibers and, therefore, is generally formed from eight tows of "low" strength and/or stiffness fibers and two tows of "high" strength and/or stiffness fibers, while the third layer 120 of the rim 100 is comprised of about 40% "low" strength and/or stiffness fibers and about 60% "high" strength and/or stiffness fibers and, therefore, is generally formed from four tows of "low" strength and/or stiffness fibers and six tows of "high" strength and/or stiffness fibers.

The specific placement of each of the different tows within each of the second and third layers 120, 130 of the rim 100 is not believed to significantly impact either the performance or durability of these layers, or of the rim in general. Therefore, the tows that form each of these layers 120, 130 of the rim 100 may generally be placed and co-mingled in any order, with none of the ten tows having a fixed placement or having any limitations on either where within the layer it may be placed, or adjacent which other tow(s) it may be located.

Each layer 120, 130 of the rim 100, however, has a currently preferred tow placement order. For example, in the second layer 120 of the rim, it is currently preferred that at least one of the two "high" strength and/or stiffness tows be either the first or tenth tow, but that both "high" strength and/or stiffness tows not be placed adjacent each other, while in the third layer 130 of the rim 100, it is currently preferred that none of the "low" strength tows be placed adjacent each other.

Although one or more preferred embodiments of the invention has/have been described using specific terms, such description is for illustrative purposes only, and it is to be understood that changes and variations may be made without departing from the spirit or scope of the following claims.

What is claimed is:

1. A composite-based rim, comprising:
    a plurality of co-mingled fiber layers, wherein at least one layer is formed of at least a low modulus fiber and a high modulus fiber, the modulus of the low modulus fiber being less than the modulus of the high modulus fiber by at least 5 Msi, and wherein at least one of the strength and stiffness of each layer increases in each layer from an innermost layer of the rim to an outermost layer of the rim.

2. The rim of claim 1, wherein at least one of the layers of the rim is comprised of a plurality of co-mingled fiber tows.

3. The rim of claim 1, wherein the rim is comprised of at least one layer that is formed entirely from one of the low modulus fiber and the high modulus fiber, and at least one layer that is formed from both the low modulus fiber and the high modulus fiber.

4. The rim of claim 1, wherein the low modulus fiber has a modulus in the range of about 8 Msi to 12 Msi and the high modulus fiber has a modulus in the range of about 28 Msi to 50 Msi.

5. The rim of claim 3, wherein at least two layers of the rim are formed of both the low modulus fiber and the high modulus fiber, and wherein one of these layers includes a greater volume percentage of the high modulus fiber as compared to the low modulus fiber, and one of these layers includes a greater volume percentage of the low modulus fiber as compared to the high modulus fiber.

6. The rim of claim 5, wherein each of layers formed of both the low modulus fiber and the high modulus fiber is formed of at least 20% by volume of both the low modulus fiber and the high modulus fiber.

7. A composite-based rim, comprising:
    four fiber layers, wherein at least one of the strength and stiffness of each layer increases in each layer from a first, innermost layer of the rim to a fourth, outermost layer of the rim, and wherein at least one of the four layers of the rim are formed of at least 10% by volume of both a low modulus fiber and a high modulus fiber, and wherein each of the four layers of the rim is formed of at least 10% of the high modulus fiber, the modulus of the low modulus fiber being at least 5 Msi less than the modulus of the high modulus fiber.

8. The rim of claim 7, wherein at least one of the four layers of the rim is comprised of a plurality of co-mingled fiber tows.

9. The rim of claim 7, wherein a second layer of the rim surrounds the first layer of the rim, a third layer of the rim surrounds the second layer of the rim, and the fourth layer of the rim surrounds the third layer of the rim, and wherein the volume percentage of the low modulus fiber decreases from the first layer of the rim to the second layer of the rim, from the second layer of the rim to the third layer of the rim, and from the third layer of the rim to the fourth layer of the rim.

10. A composite-based rim, comprising:
    a first, innermost layer formed of about 100% by volume of a low modulus fiber and about 0% by volume of a high modulus fiber;
    a second layer surrounding the first layer and being formed of about 80% by volume of the low modulus fiber and about 20% by volume of the high modulus fiber;
    a third layer surrounding the second layer and being formed of about 40% by volume of the low modulus fiber and about 20% by volume of the high modulus fiber; and
    a fourth, outermost layer surrounding the third layer and being formed of about 0% by volume of the low modulus fiber and about 100% by volume of the high modulus fiber,
    wherein the low modulus fiber has a modulus that is at least 5 Msi less than the modulus of the high modulus fiber.

11. The rim of claim 10, wherein at least one of the four layers of the rim is comprised of a plurality of co-mingled fiber tows.

12. The rim of claim 11, wherein each of the four layers of the rim is comprised of a plurality of co-mingled fiber tows.

* * * * *

UNITED STATES PATENT AND TRADEMARK OFFICE
CERTIFICATE OF CORRECTION

PATENT NO. : 6,852,401 B2  Page 1 of 1
APPLICATION NO. : 09/952151
DATED : February 8, 2005
INVENTOR(S) : Ward R. Spears et al.

It is certified that error appears in the above-identified patent and that said Letters Patent is hereby corrected as shown below:

Col. 12 line 39 should read a third layer surrounding the second layer and being formed of about 40% by volume of the low modulus fiber and about 60% by volume of the high modulus fiber; and Signed and Sealed this Fourth Day of November, 2008

JON W. DUDAS
*Director of the United States Patent and Trademark Office*